United States Patent
Kim

(10) Patent No.: US 9,975,546 B2
(45) Date of Patent: May 22, 2018

(54) ENGINE CLUTCH CONTROL SYSTEM FOR HYBRID VEHICLE AND METHOD THEREOF

(71) Applicant: Hyundai Motor Company, Seoul (KR)

(72) Inventor: Do Hee Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 303 days.

(21) Appl. No.: 14/874,986

(22) Filed: Oct. 5, 2015

(65) Prior Publication Data
US 2016/0272193 A1    Sep. 22, 2016

(30) Foreign Application Priority Data
Mar. 20, 2015  (KR) .................. 10-2015-0039222

(51) Int. Cl.
*B60K 6/442*  (2007.10)
*B60W 10/02*  (2006.01)
(Continued)

(52) U.S. Cl.
CPC ............. *B60W 20/40* (2013.01); *B60K 6/442* (2013.01); *B60W 10/02* (2013.01); *F16D 48/06* (2013.01); *B60W 2510/0241* (2013.01); *B60W 2510/0291* (2013.01); *B60W 2550/14* (2013.01); *B60W 2710/021* (2013.01); *B60Y 2200/92* (2013.01);
(Continued)

(58) Field of Classification Search
CPC ................ B60K 6/442; B60Y 2200/92; B60Y 2300/182; B60Y 2300/42; F16C 48/06
See application file for complete search history.

(56) References Cited

U.S. PATENT DOCUMENTS

| | | | |
|---|---|---|---|
| 8,452,469 B2 * | 5/2013 | Otokawa | B60K 6/365 701/111 |
| 2002/0060114 A1 * | 5/2002 | Maruyama | B60K 6/48 192/3.63 |

(Continued)

FOREIGN PATENT DOCUMENTS

| | | |
|---|---|---|
| JP | 2002-155965 | 5/2002 |
| JP | 4637443 B2 | 12/2010 |
| JP | 2012-166575 A | 9/2012 |
| JP | 2013-096483 A | 5/2013 |
| JP | 2013-244797 A | 12/2013 |

*Primary Examiner* — Thomas G Black
*Assistant Examiner* — Ce Li Li
(74) *Attorney, Agent, or Firm* — Brinks Gilson & Lione

(57) ABSTRACT

An engine clutch control system of a hybrid vehicle includes a driving information detector for detecting vehicle information and road environment information according to operation of the hybrid vehicle. An engine clutch is disposed between an engine and a motor. A hybrid controller provides an EV (electric vehicle) mode or an HEV (hybrid electric vehicle) mode by controlling engagement or disengagement of the engine clutch. The hybrid controller sets a slip estimation region of the engine clutch from an accumulated value of an APS (Accelerator Pedal position Sensor), an engine clutch temperature, or a road inclination when engagement of the engine clutch is required, and extracts a speed variation of the engine and the motor in the slip estimation region. The hybrid controller compares the speed variation of the engine and the motor with each other, and determines the engine clutch is engaged when a maximal peak is detected.

15 Claims, 7 Drawing Sheets

(51) Int. Cl.
*B60W 20/40* (2016.01)
*F16D 48/06* (2006.01)

(52) U.S. Cl.
CPC ..... *B60Y 2300/182* (2013.01); *B60Y 2300/42* (2013.01); *F16D 2500/1026* (2013.01); *F16D 2500/1045* (2013.01); *F16D 2500/1066* (2013.01); *F16D 2500/10412* (2013.01); *F16D 2500/3067* (2013.01); *F16D 2500/3068* (2013.01); *F16D 2500/30404* (2013.01); *F16D 2500/30405* (2013.01); *F16D 2500/30406* (2013.01); *F16D 2500/3127* (2013.01); *F16D 2500/3144* (2013.01); *F16D 2500/3166* (2013.01); *F16D 2500/5043* (2013.01); *F16D 2500/70406* (2013.01); *F16D 2500/70424* (2013.01); *F16D 2500/70454* (2013.01); *F16D 2500/70456* (2013.01); *F16D 2500/70668* (2013.01); *F16D 2500/70689* (2013.01); *Y10S 903/946* (2013.01)

(56) References Cited

U.S. PATENT DOCUMENTS

| | | | |
|---|---|---|---|
| 2002/0188387 A1* | 12/2002 | Woestman | G01S 13/86 701/4 |
| 2007/0080005 A1* | 4/2007 | Joe | B60K 6/48 180/65.245 |
| 2007/0102207 A1* | 5/2007 | Yamanaka | B60K 6/48 180/65.31 |
| 2010/0298092 A1* | 11/2010 | Tsuchikawa | B60K 6/365 477/71 |
| 2013/0231816 A1* | 9/2013 | Hirata | B60L 11/14 701/22 |
| 2014/0163802 A1* | 6/2014 | Tokai | F16H 61/14 701/22 |
| 2014/0172213 A1* | 6/2014 | Park | B60W 10/02 701/22 |
| 2014/0180521 A1* | 6/2014 | Tsuchikawa | B60K 6/48 701/22 |
| 2015/0051766 A1* | 2/2015 | Matsui | B60K 6/48 701/22 |

\* cited by examiner

ENGINE CLUTCH CONTROL SYSTEM FOR HYBRID VEHICLE AND METHOD THEREOF

CROSS-REFERENCE TO RELATED APPLICATION

This application claims priority to and the benefit of Korean Patent Application No. 10-2015-0039222 filed in the Korean Intellectual Property Office on Mar. 20, 2015, the entire contents of which are incorporated herein by reference.

FIELD

The present disclosure relates to an engine clutch control system of a hybrid vehicle and a method thereof.

BACKGROUND

According to a continuous demand for improvement of fuel efficiency for a vehicle and stricter regulations of discharge gas of countries, a demand for an environmentally-friendly vehicle has increased, and a hybrid vehicle has been provided as a realistic alternative for the demand.

As a power source, an engine and a motor are applied to the hybrid vehicle, and depending on driving conditions, features of the engine and the motor are embodied to provide fuel efficiency and a reduction of exhaust gas. The hybrid vehicle may provide output torque depending on how the two power sources consisting of the engine and the motor are harmoniously operated.

For the hybrid vehicles, a TMED (Transmission Mounted Electric Device) type of power train is generally used, an engine clutch is disposed between the two power sources (engine and motor), and they travel in an EV (electric vehicle) mode or an HEV (hybrid electric vehicle) mode in accordance with engagement of the engine clutch. When the engine clutch is disposed between the two power sources (engine and motor), it is difficult to control to engage the engine clutch.

Meanwhile, when the engine clutch is engaged in order to transit from an EV (electric vehicle) mode to an HEV (hybrid electric vehicle) mode is performed, the hybrid vehicle determines slip of the engine clutch in order to reduce impact and improve driving performance.

Generally, slip of the engine clutch is determined as follow. A command pressure (hydraulic pressure) for engaging the engine clutch is stored through learning while stopping, and it is determined that the engine clutch is engaged when a real time command pressure is greater than the stored command pressure. However, according to conventional art, since the engagement of the engine clutch is influenced by the external environment (for example, temperature, viscosity of oil, aging of parts, etc.), determination of the slip is inaccurate.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an engine clutch control system and a method that can determine slip of an engine clutch while not being influenced by the external environment. Further, the present disclosure has been made in an effort to provide an engine clutch control system and a method that can engage the engine clutch through slip determination of the engine clutch.

An engine clutch control system of a hybrid vehicle according to one form of the present disclosure may include: a driving information detector detecting vehicle information and road environment information according to operation of the hybrid vehicle; an engine clutch disposed between an engine and a motor. A hybrid controller provides an EV (electric vehicle) mode or an HEV (hybrid electric vehicle) mode by controlling engagement or disengagement of the engine clutch, wherein the hybrid controller sets a slip estimation region of the engine clutch from an accumulated value of an APS (Accelerator Pedal position Sensor), an engine clutch temperature, or a road inclination when engagement of the engine clutch is required, extracts a speed variation of the engine and the motor in the slip estimation region. The hybrid controller compares the speed variation of the engine and the speed variation of the motor with each other, and determines that the engine clutch is engaged when a maximal peak is detected.

The hybrid controller may divide the accumulated value of the APS into a plurality of levels, set a hydraulic pressure slope and a slip estimation region for each level. The hybrid controller determines the slip estimation region according to the accumulated value of the APS measured by the driving information detector.

The hybrid controller may alternatively divide the clutch temperature into a plurality of levels, set a hydraulic pressure slope and a slip estimation region for each level. The hybrid controller determines the slip estimation region according to a clutch temperature measured by the driving information detector.

The hybrid controller may divide the road inclination into a plurality of levels, set a hydraulic pressure slope and a slip estimation region for each level. The hybrid controller determines the slip estimation region according to the inclination measured by the driving information detector. The hydraulic pressure slope may be a slope of a slope from a predetermined slip estimation region start point to a slip estimation region end point. The hybrid controller may set the slip estimation region to be short when the hydraulic pressure slope rapidly increases, and set the slip estimation region to be long when the hydraulic pressure slope gradually increases.

The hybrid controller may extract peak candidates sequentially generated by the speed variation of the engine and the motor, compare the peak candidates with each other, and determine a point where a maximal peak is generated as a slip start point of the engine clutch. When the peak candidates are not detected in the slip estimation region, the hybrid controller may determine that the engine clutch is not physically contacted, and may determine that a pressure system engaging the engine clutch is out of order.

The hybrid controller may determine the longest slip estimation region as the slip estimation region when the slip estimation region is determined from at least two conditions of the APS accumulated value, the clutch temperature, and the road inclination.

An engine clutch control method according to another form of the present disclosure may include: checking whether an engagement request from an EV mode to an HEV mode is detected; b) setting a slip estimation region of the engine clutch from at least one of an APS (Accelerator Pedal position Sensor), an engine clutch temperature, and an inclination of a vehicle; c) extracting peak candidates sequentially generated according to an engine speed variation or a motor speed variation in the slip estimation region; and d) determining that the engine clutch is engaged when the maximal peak is detected in the slip estimation region.

The b) step may include: setting the slip estimation region from a hydraulic pressure slope according to an accumulated value of the APS; setting the slip estimation region from the hydraulic pressure slope according to the clutch temperature; and setting the slip estimation region from the hydraulic pressure slope according to the inclination of the road.

The b) step may alternatively include determining the slip estimation region as a maximal slip estimation region by comparing the at least two conditions with each other when the slip estimation region is determined from at least two conditions of the accumulated value of the APS, the clutch temperature, and the inclination of the road.

The c) step may include removing noise and offset by filtering the speed variation.

The d) step may include comparing a current peak candidate to a next peak candidate among the sequentially generated peak candidates. When a first peak candidate is less than the next peak candidate, setting the next peak candidate as the first peak candidate, and repeatedly comparing the first peak candidate to the next peak candidate; and setting the current peak candidate as a maximal peak when the current peak candidate is greater than the next peak candidate. The d) step may further include determining timing where the maximal peak is a slip start point, and engaging the engine clutch by controlling a hydraulic pressure amount supplied to the engine clutch through a clutch controller.

According to one form of the present disclosure, it is possible to exactly determine whether the engine clutch slips in real time with reference to the vehicle information and the driving circumstances, and thus power is stably supplied to the vehicle. Further, since the slip of the engine clutch is determined from physical contact of the engine clutch, various problems generated by misjudgment of the slip state of the engine clutch can be prevented. In addition, since it can be indirectly determined whether the pressure system that engages the engine clutch is out of order according to the present disclosure, damage of the engine clutch by unnecessary power supply can be prevented.

DRAWINGS

DETAILED DESCRIPTION

Figure 1:
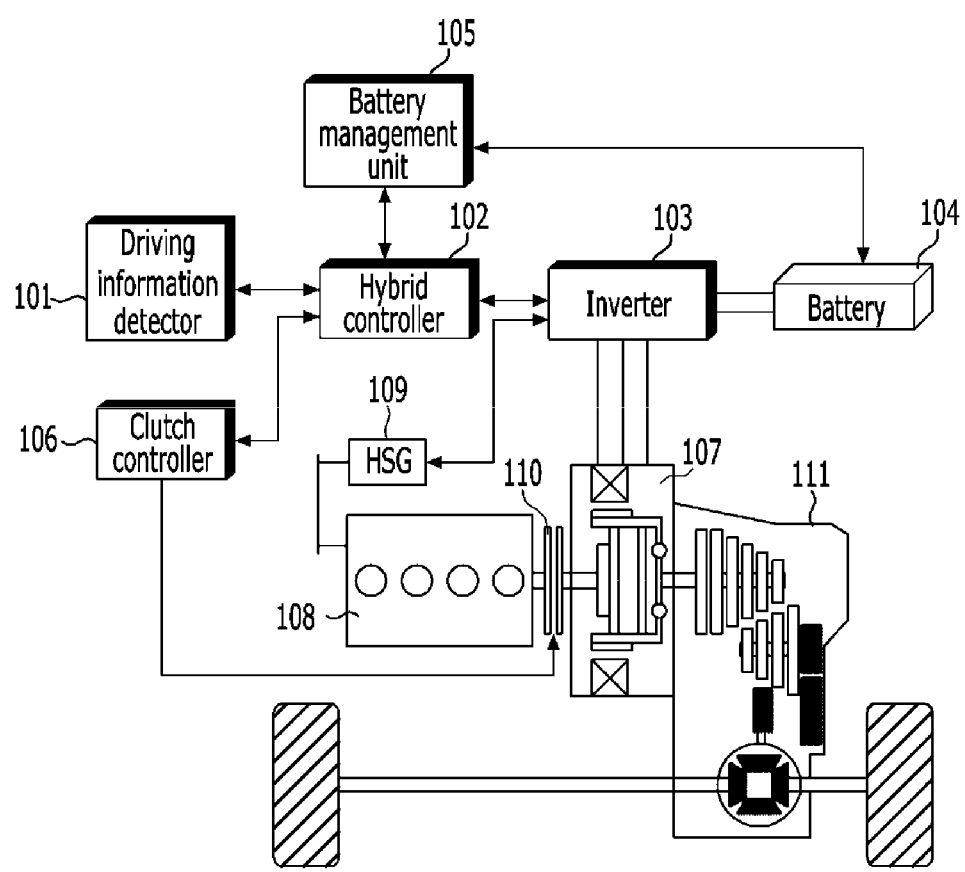
FIG. 1 is a schematic diagram illustrating an engine clutch control system of a hybrid vehicle according to one form of the present disclosure.

In the following detailed description, only certain forms of the present disclosure have been shown and described, simply by way of illustration. As those skilled in the art would realize, the described forms may be modified in various different ways, all without departing from the spirit or scope of the present disclosure. Accordingly, the drawings and description are to be regarded as illustrative in nature and not restrictive. Like reference numerals designate like elements throughout the specification.

In addition, unless explicitly described to the contrary, the word "comprise" or variations such as "comprises" or "comprising" will be understood to imply the inclusion of stated elements, but not the exclusion of any other elements. In addition, the terms "-er", "-or", and "module" described in the specification mean units for processing at least one function and operation, and can be implemented by hardware components or software components and combinations thereof.

The present disclosure provides an engine clutch control system and a method of a hybrid vehicle, as now described in detail with reference to accompanying drawings.

FIG. 1 is a schematic diagram illustrating an engine clutch control system of a hybrid vehicle according to one form the present disclosure. The engine clutch control system includes a driving information detector 101, a hybrid controller 102, an inverter 103, a battery 104, a battery management unit 105, a clutch controller 106, a motor 107, an engine 108, an HSG (Hybrid Starter and Generator) 109, an engine clutch 110, and a transmission 111.

The driving information detector 101 detects vehicle information and road environment information including a vehicle speed, a gear shift stage of a transmission, a displacement of an accelerator pedal ("APS," Accelerator Pedal position Sensor), a displacement of a brake pedal (BPS), a clutch temperature, and an inclination of a road. The vehicle information and the road environment information are transmitted to the hybrid controller 102.

The hybrid controller 102 integrally controls various controllers connected through a network. The hybrid controller 102 may be implemented by one or more processors operated by a predetermined program, in which the predetermined program is set to perform steps of an engine clutch control method of a hybrid vehicle according to the present disclosure.

The hybrid controller 102 engages the engine clutch 110 disposed between the engine 108 and the motor 107 through the clutch controller 106 when a transition to a HEV (hybrid electric vehicle) mode is required from a driving requirement detected by the driving information detector 101 and an SOC (state of charge) detected by the battery management unit 105 while the hybrid vehicle travels in an EV (electric vehicle) mode. Therefore, the vehicle travels in the HEV mode.

Particularly, when the engine clutch 110 is engaged, the hybrid controller 102 sets a slip estimation region of the engine clutch from the vehicle information and the road environment information including an accumulated value (variation value) of the APS, the clutch temperature, and the inclination of the road for determining a physical slip state of the engine clutch 110. Here, the slip of the engine clutch 110 means a transient state in which the engine clutch 110 is engaged but a speed variation between sides of the engine clutch 110 respectively connected to the engine 108 and the motor 107 is greater than a predetermined speed. That is, the transient state is a state before the engine clutch is completely engaged.

The hybrid controller 102 extracts peak candidates generated by speed variation of the engine 108 and the motor 107 in real time, and determines that the maximal peak is a slip start point by comparing the peak candidates. When the slip start point of the engine clutch 110 is determined, the hybrid controller 102 controls hydraulic pressure supplied to the engine clutch 110 through the clutch controller 106, engages the engine clutch 110, and thus controls the vehicle to travel in the HEV mode.

When the peak candidates are not extracted in the slip estimation region, the hybrid controller 102 determines that the engine clutch 110 is not physically contacted, and determines whether a pressure system (not shown) engaging the engine clutch 110 is out of order.

The inverter 103 is formed by a plurality of power switching elements, converts a DC voltage from the battery 104 into a three-phase AC voltage according to a control signal from the hybrid controller 102, and controls driving of the motor 107. The power switching element forming the inverter 103 may be any one of an insulated gate bipolar transistor (IGBT), a MOSFET, a transistor, and a relay.

The battery 104 consists of a plurality of unit cells, and a high voltage, for example, 400 V to 450 V DC, is stored therein to provide the voltage to the motor 107. The battery manager 105 detects currents, voltages, and temperatures of the respective cells in an operating region of the battery 104 to control the SOC, and controls charging and discharging voltages of the battery 104 such that over-discharge below a lower threshold voltage or over-charge above an upper threshold voltage can be prevented to prevent the lifespan of the battery 104 from being shortened.

The clutch controller 106 controls engagement of the target gear shift stage by controlling an actuator provided in the transmission 111 according to the control signal of the hybrid controller 102. The clutch controller 106 controls engagement and disengagement of the engine clutch 110 by controlling hydraulic pressure supplied to the engine clutch 110, and controls the vehicle that travels in the EV mode and the HEV mode.

The motor 107 is operated with the three-phase AC voltage from the inverter 103 and generates torque, and is operated as a generator in coast-down to provide regenerative energy to the battery 104. The engine 108 outputs first power as a power source in the turned-on state. The HSG 109 operates as an electric motor according to the control signal from the hybrid controller 102 to turn on the engine 108. The HSG 109 also operates as a generator to generate a voltage while the engine 108 maintains the turned-on state, and provides the generated voltage to the battery 104 as a charging voltage through the inverter 103.

The engine clutch 110 is disposed between the engine 108 and the motor 107 and delivers or cuts off the power of the engine 108, thereby providing driving of the vehicle in the EV mode and the HEV mode.

The transmission 111 is provided in an automatic transmission or continuous variable transmission (CVT), and engagement elements and disengagement elements are operated by the hydraulic pressure such that a target gear shift stage is combined by the clutch controller 106. In order to satisfy required torque of a driver, it needs power combination of the engine 108 and the motor 107. The engine clutch 110 is used for the assembly of the two power sources (engine and motor). It is very important to determine the slip point of the engine clutch 110 in order to realize stable and quick power transmission.

When the engine clutch 110 slips, since the engine clutch 110 is not substantially engaged, a dynamic state of the engine clutch 110 is unstable. Therefore, because slip timing of the engine clutch 110 influences acceleration responsiveness and drivability, the engine clutch control system of the hybrid vehicle according to one form of the present disclosure detects slip timing of the engine clutch 110, and performs the power delivery process by dividing power delivery command of before and after slip of the engine clutch 110. Hereinafter, a method for determining a slip state of the engine clutch 110 from the vehicle information and road environment information will be described in detail with reference to FIG. 2 to FIG. 5.

Figure 2:
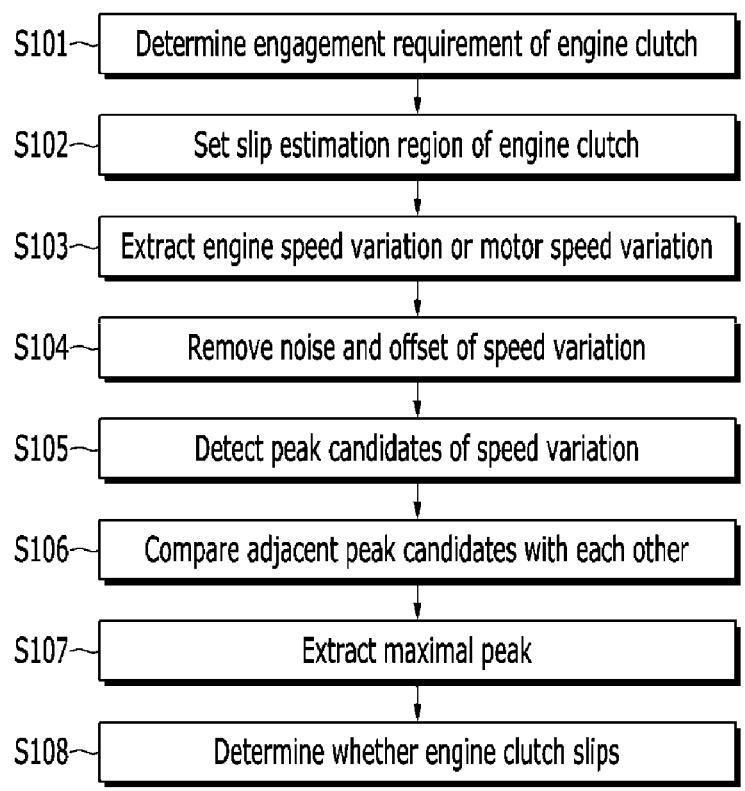
FIG. 2 is a flowchart illustrating a method for determining a slip state of an engine clutch according to one form of the present disclosure.

FIG. 2 is a flowchart illustrating a method for determining a slip state of the engine clutch according to an exemplary embodiment of the present disclosure. The hybrid controller 102 determines an engagement requirement of the engine clutch 110 for transition from the EV mode to the HEV mode at step S101. The hybrid controller 102 can determine the engagement requirement of the engine clutch 110 from the accumulated value of the APS and the SOC of the battery 104 detected by the driving information detector 101. When the engagement requirement of the engine clutch 110 is determined, the hybrid controller 102 sets a slip estimation region of the engine clutch 110 by using a hydraulic pressure profile according to vehicle information and driving circumstances detected by the driving information detector in order to slip the engine clutch 110, at step S102. In detail, the hybrid controller 102 may set a slip estimation region of the engine clutch according to the accumulated value of the APS, the clutch temperature, and the inclination of a road.

Figure 3:
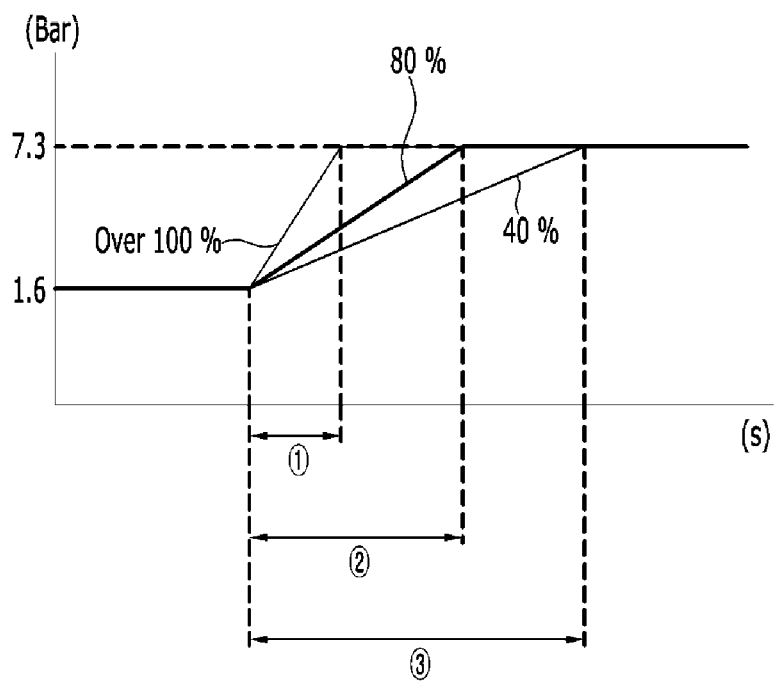
FIG. 3 is a diagram illustrating a method that sets a slip estimation region from an accumulated value of an APS and a hydraulic pressure slope according to one form of the present disclosure.

FIG. 3 is a diagram illustrating a method that sets a slip estimation region from an accumulated value of an APS and a hydraulic pressure slope according to an exemplary embodiment of the present disclosure. The hybrid controller 102 divides the accumulated value of the APS into a plurality of levels, sets the slip estimation region and a hydraulic pressure slope for each level, and determines the slip estimation region according to the accumulated value of the APS measured by the driving information detector. The hydraulic pressure slope is a slope from a predetermined slip estimation region start point (1.6 bar) to a slip estimation region end point (7.3 bar). In FIG. 3, the slip estimation region of a ① region where the hydraulic pressure slope is steep is shortest, and the slip estimation region of a ③ region where the hydraulic pressure slope is smooth is longest. If a driver's acceleration intention is high, the accumulated value of the APS is increased. Therefore, when the accumulated value of the APS is greater than 100%, the hydraulic pressure slope becomes steep (for example, 0.6 bar/ms), and thus the hybrid controller 102 may determine the slip estimation region as the ① region, where the slip estimation region is shortest. On the contrary, when the driver's acceleration intention is relatively low and thus the accumulated value of the APS is 40%, the hydraulic pressure slope becomes smooth (for example, 0.2 bar/ms), and thus the hybrid controller 102 may determine the slip estimation region as the ③ region, where the slip estimation region is longest.

Figure 4:
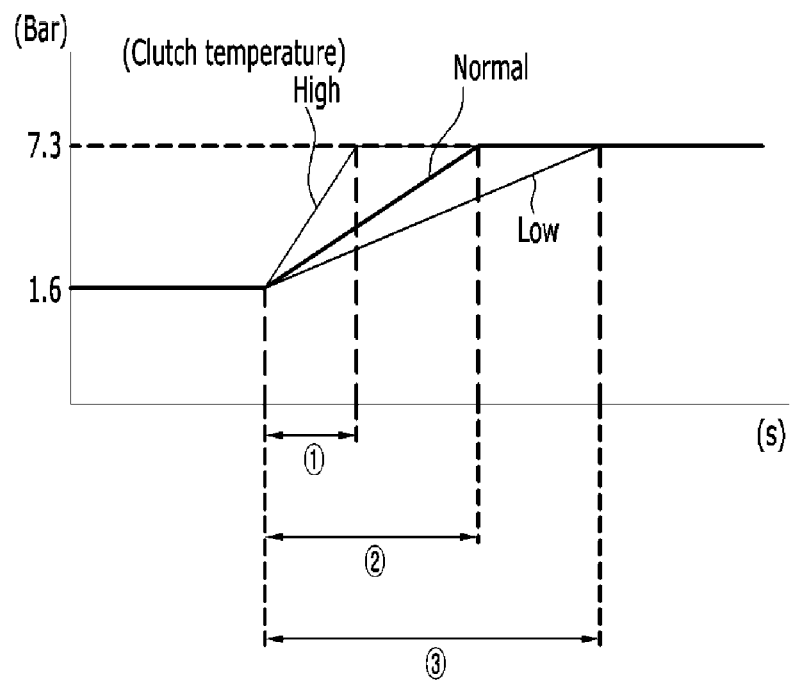
FIG. 4 is a diagram illustrating a method of setting a slip estimation region from a clutch temperature and a hydraulic pressure slope according to another form of the present disclosure.

FIG. 4 is a diagram illustrating a method that sets a slip estimation region from a clutch temperature and a hydraulic pressure slope according to another form the present disclosure. The hybrid controller 102 divides the clutch temperature reflecting viscosity of the hydraulic pressure oil into a plurality of levels, sets the hydraulic pressure slope and the slip estimation region for each level, and determines the slip estimation region according to the clutch temperature measured by the driving information detector. If the viscosity of the hydraulic pressure oil is decreased, the clutch temperature is increased. Therefore, when the clutch temperature is at a high level, the viscosity of the hydraulic pressure oil is decreased, the hydraulic pressure slope becomes steep (for example, 0.6 bar/ms), and thus the hybrid controller 102 may determine the slip estimation region as the ① region, where the slip estimation region is shortest. On the contrary, when the clutch temperature is at a low level, the viscosity of the hydraulic pressure oil is increased, the hydraulic pressure slope becomes smooth (for example, 0.2 bar/ms), and thus the hybrid controller 102 may determines the slip estimation region as the ③ region, where the slip estimation region is longest.

Figure 5:
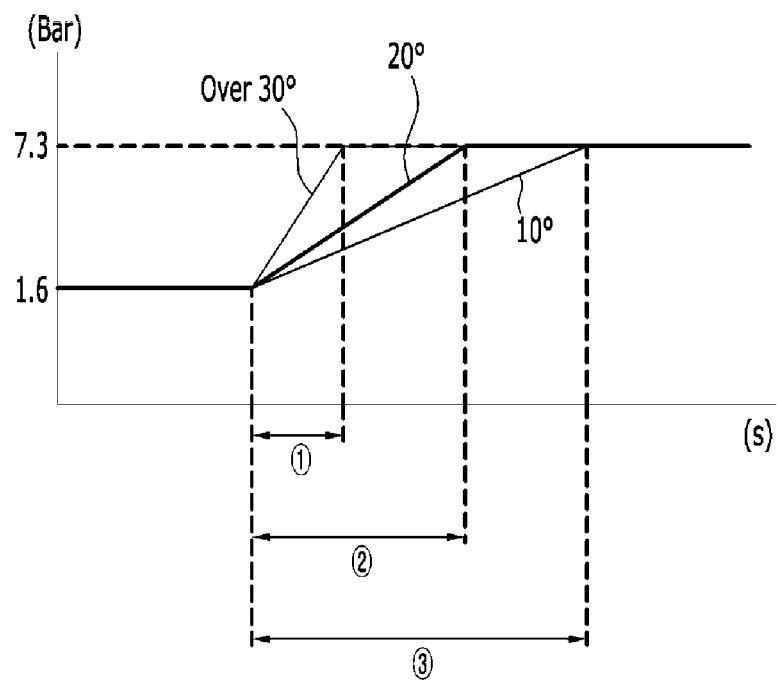
FIG. 5 is a diagram illustrating a method of setting a slip estimation region from an inclination of a vehicle and a hydraulic pressure slope according to still another form of the present disclosure.

FIG. 5 is a diagram illustrating a method that sets a slip estimation region from an inclination of a vehicle and a hydraulic pressure slope according to still another form of the present disclosure. The hybrid controller 102 divides the road inclination reflecting driving circumstances into a plurality of levels, sets the hydraulic pressure slope and the slip estimation region for each level, and determines the slip estimation region according to the road inclination measured by the driving information detector. When the road inclination is high at greater than 30 degrees, the hydraulic pressure slope becomes steep (for example, 0.6 bar/ms), and thus the hybrid controller 102 may determine the slip estimation region as the ① region, where the slip estimation region is shortest. On the contrary, when the road inclination is relatively low and is 10 degrees or less, the hydraulic pressure slope becomes smooth (for example, 0.2 bar/ms), and the hybrid controller 102 may determine the slip estimation region as the ③ region, where the slip estimation region is longest.

Meanwhile, when the hybrid controller 102 determines the slip estimation region from at least two of the following conditions, the accumulated value of the APS, the clutch temperature, or the inclination of the road. The hybrid controller 102 may determine the longest slip estimation region as the slip estimation region by comparing them with each other.

For example, when a first slip estimation region according to the accumulated value of the APS is the ① region and a second slip estimation region according to the clutch temperature is the ③ region, the slip estimation region of the ③ region is longer than that of the ① region. Therefore, the hybrid controller 102 determines the slip estimation region as the ③ region, such that an engagement delay and a misjudgment of the engine clutch by increment of the viscosity of the oil can be solved.

Referring to FIG. 2, the hybrid controller 102 extracts an engine speed variation or a motor speed variation in the predetermined slip estimation region at step S103, and removes noise and offset by filtering the speed variation at step S104. The hybrid controller 102 detects peak candidates from the filtered speed variation in real time at step S105, compares the adjacent peak candidates with each other at step S106, and extracts a maximal peak at step S107. The hybrid controller 102 determines whether the engine clutch 110 slips from the maximal peak at step S108.

Figure 6:
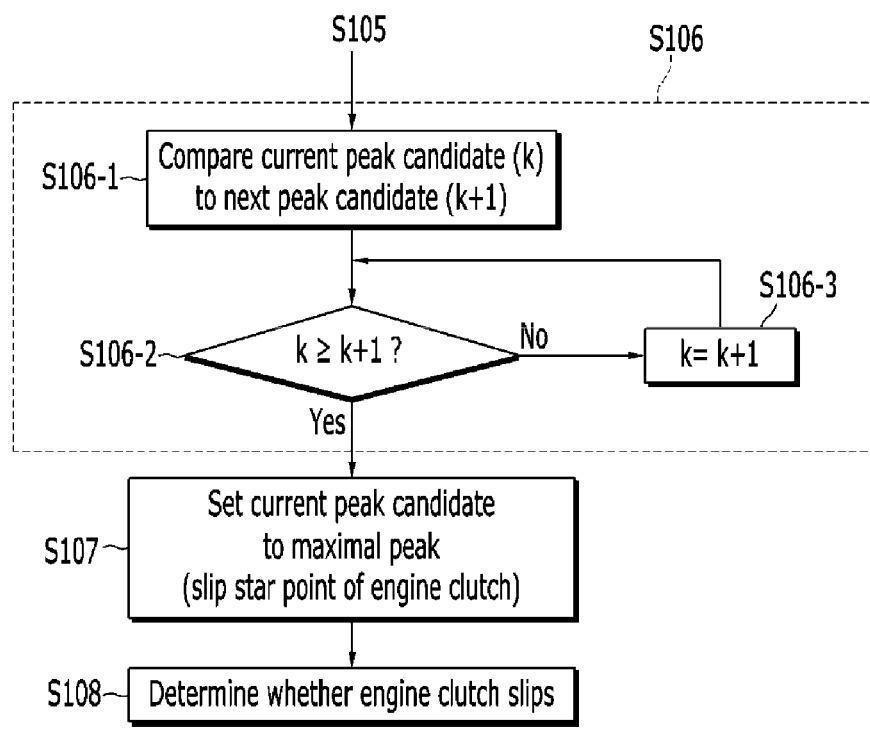
FIG. 6 is a flowchart illustrating a method for determining a slip start point according to one form of the present disclosure.
Figure 7:
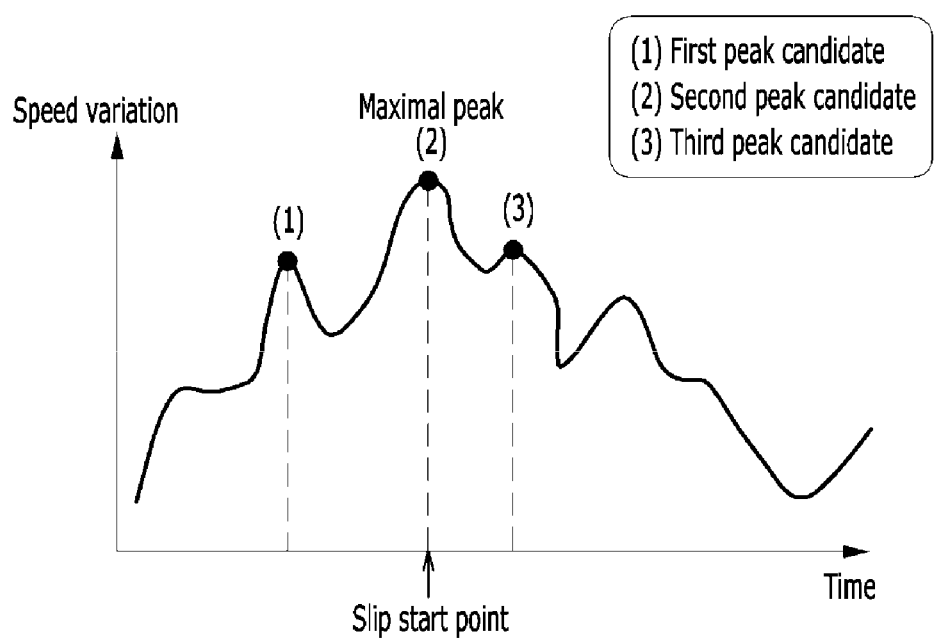
FIG. 7 is a graph illustrating a method for determining a slip start point according to one form of the present disclosure.

Hereinafter, a method for determining a slip start point from the maximal peak will be described with reference to FIG. 6 and FIG. 7. FIG. 6 is a flowchart illustrating a method for determining a slip start point according to one form of the present disclosure. FIG. 7 is a graph illustrating a method for determining a slip start point according to one form of the present disclosure.

Referring to FIG. 6, the hybrid controller 102 compares a current peak candidate (k) to a next peak candidate (k+1) among the peak candidates sequentially generated at step (S106-1). For example, referring to FIG. 7, the hybrid controller 102 compares a first peak candidate 1 to a second peak candidate 2, and compares the second peak candidate 2 to a third peak candidate 3, among the peak candidates sequentially generated at step S106-1. When the speed variation of the current peak candidate (k) is not greater than the next peak candidate (k+1) at step S106-2, the hybrid controller 102 sets the next peak candidate as the current peak candidate, and repeatedly compares the current peak candidate to the next current peak candidate at step S106-3.

Referring to FIG. 7, the first peak candidate 1 is less than the second peak candidate. Therefore, the hybrid controller 102 determines that the speed variation is generated by instantaneous contact of the engine clutch 110, and does not determine timing where the first peak candidate 1 is generated as the slip start point of the engine clutch 110. On the contrary, when the speed variation of the current peak candidate (k) is greater than the speed variation of the next peak candidate (k+1) at step S106-2, the hybrid controller 102 sets the current peak candidate to the maximal peak, and determines the timing where the peak candidate is generated as the slip start point of the engine clutch at step S107.

Referring to FIG. 7, the second peak candidate 2 is greater than the third peak candidate 3. Therefore, the hybrid controller 102 determines timing where the second peak candidate 2 is generated as the maximal peak, and the hybrid controller 102 determines that the engine clutch slips from timing at which the maximal peak is generated at step S108. When the slip start point of the engine clutch 110 is determined, the hybrid controller 102 engages the engine clutch 110 by controlling the hydraulic pressure amount supplied to the engine clutch 110 through the clutch controller 106. Therefore, the vehicle travels in the HEV mode.

As described above, according to one form of the present disclosure, it is possible to exactly determine whether the engine clutch 110 slips in real time with reference to the vehicle information and the driving circumstances, and thus power is stably supplied to the vehicle. Further, since the slip of the engine clutch is determined from physical contact of the engine clutch, various problems generated by misjudgment of the slip state of the engine clutch can be prevented. In addition, since it can be indirectly determined whether the pressure system that engages the engine clutch is out of order according to the present disclosure, damage to the engine clutch by unnecessary power supply can be prevented.

The above-described forms can be realized through a program for realizing functions corresponding to the configuration of the embodiments or a recording medium for recording the program of the above-described device and/or method, by a person skilled in the art.

While this disclosure has been described in connection with what is presently considered to be one form, it is to be understood that the disclosure is not limited to the disclosed form, but, on the contrary, is intended to cover various modifications and equivalent arrangements included within the spirit and scope of the appended claims.

What is claimed is:

1. An engine clutch control system of a hybrid vehicle, comprising:
    a driving information detector detecting vehicle information and road environment information according to operation of the hybrid vehicle;
    an engine clutch disposed between an engine and a motor; and
    a hybrid controller providing an EV (electric vehicle) mode or an HEV (hybrid electric vehicle) mode by controlling engagement or disengagement of the engine clutch,
    wherein the hybrid controller sets a slip estimation region of the engine clutch from an accumulated value of an APS (Accelerator Pedal position Sensor), an engine clutch temperature, or a road inclination when engagement of the engine clutch is required, and
    the hybrid controller extracts a speed variation of the engine and the motor in the slip estimation region, compares the speed variation of the engine and the speed variation of the motor with each other, and
    wherein the hybrid controller is configured to engage the engine clutch using a clutch controller configured to control an amount of hydraulic pressure supplied to the engine clutch, and to determine that the engine clutch is engaged when a maximal peak is detected.

2. The engine clutch control system of the hybrid vehicle of claim 1, wherein the hybrid controller divides the accumulated value of the APS into a plurality of levels, sets a hydraulic pressure slope and a slip estimation region for each level, and determines the slip estimation region according to the accumulated value of the APS measured by the driving information detector.

3. The engine clutch control system of the hybrid vehicle of claim 1, wherein the hybrid controller divides the clutch temperature into a plurality of levels, sets a hydraulic pressure slope and a slip estimation region for each level, and determines the slip estimation region according to a clutch temperature measured by the driving information detector.

4. The engine clutch control system of the hybrid vehicle of claim 1, wherein the hybrid controller divides the road inclination into a plurality of levels, sets a hydraulic pressure slope and a slip estimation region for each level, and determines the slip estimation region according to the inclination measured by the driving information detector.

5. The engine clutch control system of the hybrid vehicle of claim 2, wherein the hydraulic pressure slope is a slope from a slope from a predetermined slip estimation region start point to a slip estimation region end point.

6. The engine clutch control system of the hybrid vehicle of claim 5, wherein the hybrid controller sets the slip estimation region to be short when the hydraulic pressure slope rapidly increases, and sets the slip estimation region to be long when the hydraulic pressure slope gradually increases.

7. The engine clutch control system of the hybrid vehicle of claim 1, wherein the hybrid controller extracts peak candidates sequentially generated by the speed variation of the engine and the motor, compares the peak candidates with each other, and determines a point where the maximal peak is generated as a slip start point of the engine clutch.

8. The engine clutch control system of the hybrid vehicle of claim 7, wherein the hybrid controller when the peak candidates are not detected in the slip estimation region, determines that the engine clutch is not physically contacted, and determines that a pressure system engaging the engine clutch is out of order.

9. The engine clutch control system of the hybrid vehicle of claim 1, wherein the hybrid controller determines a longest slip estimation region as the slip estimation region when the slip estimation region is determined from at least two conditions, the accumulated value of the APS, the engine clutch temperature, and the road inclination.

10. An engine clutch control method comprising:
    a) checking whether an engagement request from an EV (electric vehicle) mode to an HEV (hybrid electric vehicle) mode is detected;
    b) setting a slip estimation region of an engine clutch from at least one of an APS (Accelerator Pedal position Sensor), an engine clutch temperature, and an inclination of a road;
    c) extracting peak candidates sequentially generated according to an engine speed variation or a motor speed variation in the slip estimation region; and
    d) engaging the engine clutch by controlling an amount of hydraulic pressure supplied to the engine clutch by a clutch controller, and determining that the engine clutch is engaged when a maximal peak is detected in the slip estimation region.

11. The engine clutch control method of claim 10, wherein the b) step further comprises:
    setting the slip estimation region from a hydraulic pressure slope according to an accumulated value of the APS;
    setting the slip estimation region from the hydraulic pressure slope according to the clutch temperature; and
    setting the slip estimation region from the hydraulic pressure slope according to the inclination of the road.

12. The engine clutch control method of claim 10, wherein the b) step further comprises:
    determining the slip estimation region as a maximal slip estimation region by comparing the at least two conditions with each other when the slip estimation region is determined from at least two conditions of an accumulated value of the APS, the clutch temperature, and the inclination of the road.

13. The engine clutch control method of claim 10, wherein the c) step further comprises:
    removing noise and offset by filtering the engine speed variation or the motor speed variation.

14. The engine clutch control method of claim 10, wherein the d) step further comprises:
    comparing a current peak candidate to a next peak candidate among the sequentially generated peak candidates;
    when a first peak candidate is less than the next peak candidate, setting the next peak candidate as the first peak candidate, and repeatedly comparing the first peak candidate to the next peak candidate; and
    setting the current peak candidate as the maximal peak when the current peak candidate is greater than the next peak candidate.

15. The engine clutch control method of claim 14, wherein the d) step further comprises:
    determining timing where the maximal peak is a slip start point; and
    performing the step of engaging the engine clutch by the clutch controller when the slip start point is determined.

* * * * *